United States Patent
Koide et al.

(10) Patent No.: US 7,735,624 B2
(45) Date of Patent: Jun. 15, 2010

(54) ARTICLE TRANSPORTING FACILITY AND METHOD OF CONTROLLING THE FACILITY

(75) Inventors: Hiroyuki Koide, Gamo-gun (JP); Hiroyuki Kozawa, Gamo-gun (JP)

(73) Assignee: Daifuku Co., Ltd., Osaka (JP)

( * ) Notice: Subject to any disclaimer, the term of this patent is extended or adjusted under 35 U.S.C. 154(b) by 185 days.

(21) Appl. No.: 11/524,427

(22) Filed: Sep. 20, 2006

(65) Prior Publication Data
US 2007/0068770 A1 Mar. 29, 2007

(30) Foreign Application Priority Data
Sep. 29, 2005 (JP) ............................. 2005-284383

(51) Int. Cl.
- B65G 37/00 (2006.01)
- B65G 47/10 (2006.01)
- B65G 47/46 (2006.01)
- B65G 1/00 (2006.01)
- B65G 65/00 (2006.01)

(52) U.S. Cl. .................... 198/358; 198/346.1; 198/349; 198/349.5; 198/349.6; 198/349.7; 198/349.8; 414/273

(58) Field of Classification Search .............. 198/346.1, 198/358, 349, 349.5, 349.6, 349.7, 349.8
See application file for complete search history.

(56) References Cited

U.S. PATENT DOCUMENTS

| | | | |
|---|---|---|---|
| 6,011,998 A * | 1/2000 | Lichti et al. ................. | 700/230 |
| 2005/0047895 A1* | 3/2005 | Lert, Jr. ....................... | 414/273 |
| 2005/0080524 A1 | 4/2005 | Park | |
| 2006/0073002 A1 | 4/2006 | Koide | |

FOREIGN PATENT DOCUMENTS

| | | |
|---|---|---|
| EP | 1512661 A1 | 3/2005 |
| JP | 63169256 | 7/1988 |
| JP | 63225005 | 9/1988 |
| JP | 2002-175117 | 6/2002 |

* cited by examiner

*Primary Examiner*—Gene Crawford
*Assistant Examiner*—Yolanda Cumbess
(74) *Attorney, Agent, or Firm*—The Webb Law Firm

(57) ABSTRACT

An article transporting facility includes:
a single predetermined path disposed along a plurality of article transfer locations and having a first end and a second end;
a predetermined number of article transporting carriages traveling on the predetermined path;
controlling means for controlling traveling of the predetermined number of article transporting carriages;
wherein based on article transport request information for transporting an article from an original article transfer location to a destination article transfer location among the plurality of article transfer locations, the controlling means controls the traveling of the transporting carriages such that the controlling means selects an article transporting carriage from the plurality of article transporting carriages for causing the selected carriage to transfer the article from the original article transfer location to the destination article transfer location; and
when a multiple request condition exists wherein a plurality of transport request information designating a same single article transfer location as the original article transfer location are issued, the controlling means executes a multiple carriage selecting mode wherein the controlling means selects a plurality of article transporting carriages from the predetermined number of article transporting carriages for article transport.

17 Claims, 8 Drawing Sheets

ARTICLE TRANSPORTING FACILITY AND METHOD OF CONTROLLING THE FACILITY

BACKGROUND OF THE INVENTION

The present invention relates to an article transporting facility including a single predetermined path disposed along a plurality of article transfer locations and having opposed ends, a plurality of article transporting carriages traveling on the predetermined path, and a controller for controlling traveling of the predetermined number of article transporting carriages. Based on article transport request information for transporting an article from an original article transfer location to a destination article transfer location among the plurality of article transfer locations, the controller selects an article transporting carriage from the plurality of article transporting carriages for causing the selected carriage to transfer the article from the original article transfer location to the destination article transfer location.

The article transporting facility of the above-noted type is for use in e.g. an automated warehouse. In response to each article transport request information issued, the transporting operation of an article from an original article transfer location to a destination article transfer location is effected, and the facility effects such transporting operation one after another in repetition, with utilizing a plurality of article transporting carriages.

According to one known article transporting facility of the above-noted type, there are provided two article transporting carriages, and controlling means selects one of the two article transporting carriages for effecting an article transporting operation, based on transport request information (see, e.g. JP 2002-175117).

Referring more particularly to this conventional article transporting facility, adjacent each one of the opposed ends of the predetermined path, there is set an "allotted area" accessible by only predetermined one of the carriages. At the center area of the predetermined path, there is set a "shared area" accessible by both of the two carriages, but prohibiting simultaneous access by the two carriages. In operation, the controlling means selects one of the two article transporting carriages, depending on e.g. which of the opposed allotted areas the original article transfer location included in the transport request information is present.

With the above-described article transporting facility, by setting the allotted areas and the shared area, the article transfer locations accessible by each carriage are limited to some of the plurality of article transfer locations. On the other hand, there is also known an article transporting facility in which the article transporting carriages are accessible to all of the article transfer locations, without setting such allotted areas or shared area.

According to this conventional article transporting facility in which the article transporting carriages are rendered accessible to all the article transfer locations, the controlling means selects, from a plurality of article transporting cars, one particular carriage for effecting a requested article transporting operation, which particular carriage is located near the original article transfer location included in each transport request information.

Then, with this conventional article transporting facility, since the controlling means selects one particular carriage located near the original article transfer location included in the transport request information, depending on the situation of issuance of the article transport request information, it may happen that a same single article transporting carriage is selected repeatedly as the carriage for effecting a series of requested article transporting operations.

Therefore, in spite of the fact that a plurality of article transporting carriages are provided, the same single carriage may be used in repetition for effecting articles from transport starting article transfer location(s) to destination article transfer location(s). Thus, the facility fails to take advantage of utilization of the plurality of carriages, thus failing to improve transporting ability.

Referring more particularly to the above facility with reference to FIG. 1, a plurality of stations 1 as article transfer locations are arranged along the length of a predetermined path 2. As article transporting carriages, 3, two carriages, i.e. a first article transporting carriage 3a and a second article transporting carriage 3b are provided. These two carriages 3 can travel to/from, i.e. are accessible to all of the plural stations 1.

As an issuance situation of transport request information, it may happen that transport request information may issue in a plurality of times, which designate, among the plurality of stations 1, the station 1c located on the most left-side in FIG. 1 as the transport starting station. For instance, such situation tends to occur during certain hours when a great number of article retrieval operations from article storage shelves article or storage operations to the article storage shelves are carried out in a concentrated manner.

And, the transport starting station 1c designated in the transport request information is located close to the first article transporting carriage 3a of the first and second article transporting carriages 3a, 3b. Then, if the controlling means selects, from the two article transporting carriages 3, the one carriage located near the transport starting station 1c, the first article transporting carriage 3a will be selected repeatedly as the carriage for effecting the plurality of article transporting operations.

Hence, the first article transporting carriage 3a alone will be used repeatedly for transporting articles from the transport starting station to transport destination station(s), whereas the facility fails to utilize the second article transporting carriage 3b.

SUMMARY OF THE INVENTION

The present invention has been made in view of the above-described state of the art. The primary object of the present invention is to provide an article transporting facility capable of improving transporting ability.

For accomplishing the above-noted object, according to the present invention, there is proposed an article transporting facility comprising:

a single predetermined path disposed along a plurality of article transfer locations and having a first end and a second end;

a predetermined number of article transporting carriages traveling on the predetermined path;

controlling means for controlling traveling of the predetermined number of article transporting carriages;

wherein based on article transport request information for transporting an article from an original article transfer location to a destination article transfer location among the plurality of article transfer locations, the controlling means controls the traveling of the transporting carriages such that the controlling means selects an article transporting carriage from the plurality of article transporting carriages for causing the selected carriage to transfer the article from the original article transfer location to the destination article transfer location; and under a multiple request condition in which a plurality of transport request information are being generated concurrently, with designating a same single article transfer location as the original article transfer location, the controlling means executes a multiple carriage selecting mode wherein the controlling means selects a plurality of article transporting carriages from the predetermined number of article transporting carriages for article transport.

With the above-described facility construction, in the event of a plurality of transport request information designating a same article transfer location, among the plurality of spots, as the original article transfer location, the article transporting operations from the original article transfer location to destination article transfer location(s) can be carried out by a plurality of article transporting carriages. Therefore, the articles can be transferred with utilization of the plurality of article transporting carriages, hence, there has been achieved an article transporting facility capable of improving transporting ability.

DETAILED DESCRIPTION OF PREFERRED EMBODIMENTS

Preferred embodiments of an article transporting facility relating to the present invention will be described with reference to the accompanying drawings. In the specification and claims, the expression "an original article transfer location" is used to indicate a transfer location the article is transferred from, as opposed to "a destination article transfer location"

First Embodiment

Figure 1:
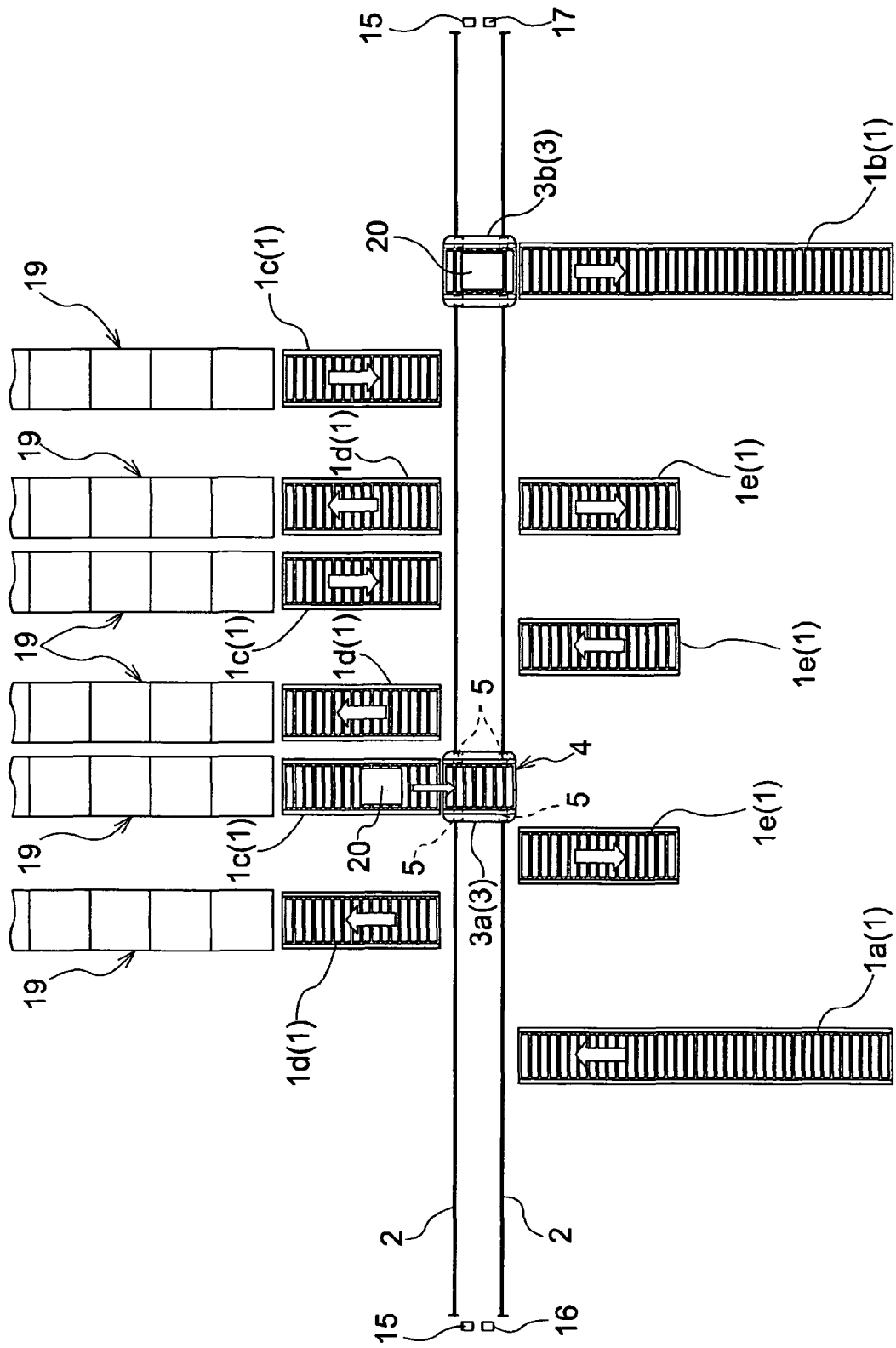
FIG. 1 is a plan view of an article transporting facility.

Referring to the first embodiment, an article transporting facility according to this first embodiment is adapted for use in e.g. an automated warehouse, as shown in FIG. 1. In this facility, a plurality of article transporting carriages 3 are provided to travel on a predetermined path 2 across a plurality of stations 1 as article transfer locations. As these article transporting carriages travel on the predetermined path 2, articles are transferred to/from the plurality of stations 1.

The predetermined path 2 is a linear predetermined path having opposed ends. And, on opposed sides across this predetermined path 2, the plurality of stations 1 are arranged and spaced apart from each other along the length of this predetermined path 2.

Referring to the stations 1 in greater details, the stations 1 include a carry-in station 1a having a carry-in conveyer for transporting articles 20 carried in from the outside, a carry-out station 1b having a carry-out conveyer for carrying articles 20 to the outside, retrieval stations 1c each having a retrieval conveyer for transporting articles out of an article storage shelf 19 and storage stations 1d each having a storage conveyer for storing articles 20 into the article storage shelf 19.

Each article storage shelf 19 includes a plurality of storage compartments adapted for storing the articles 20 and arranged one above another along the vertical direction and side by side along the right/left direction. These article storage shelves 19 are disposed and spaced apart from each other along the length of the predetermined path 2 in one-to-one correspondence with the carry-out station 1c and the carry-in station 1d. Though not shown, this article transporting facility further includes stacker crane for transporting articles, between the carry-in station 1d and the article storage shelf 19 and between the article storage shelf 19 and the carry-out station 1c.

As the article transporting carriages 3, there are provided such carriages, i.e. a first article transporting carriage 3a and a second article transporting carriage 3b. Each carriage 3a or 3b includes an electrically driven transfer device 4 such as a roller conveyer, for transferring the article 20 to and from the station 1, a plurality of traveling wheels 5 for traveling on traveling rails laid out along the predetermined path 2 and so on.

The traveling wheels 5 consists of drive traveling wheels rotatably driven by an inverter running motor 6 and driven traveling wheels.

Figure 2:
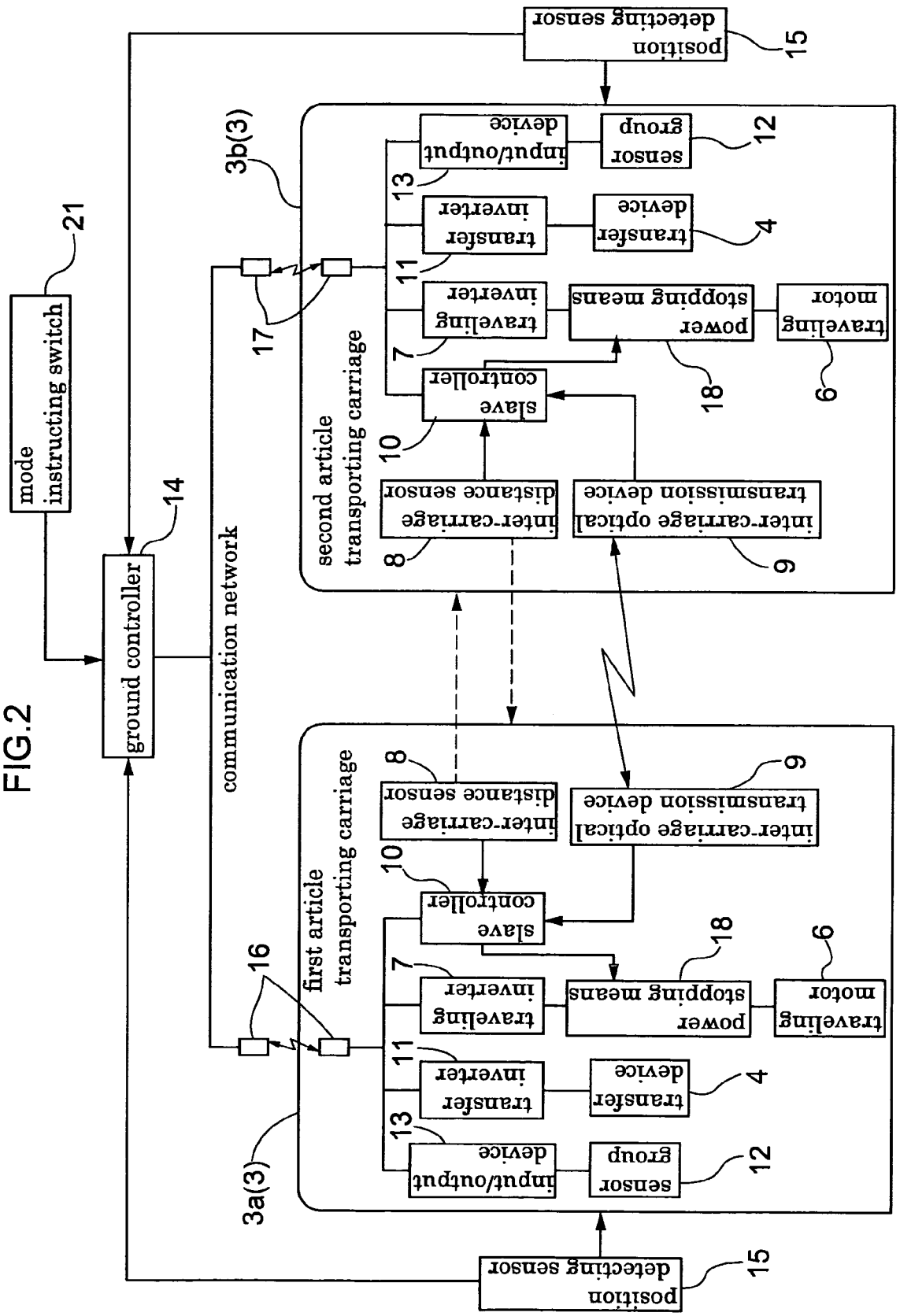
FIG. 2 is a control block diagram of the article transporting facility.

Further, each of the first article transporting carriage 3a and the second transporting carriage 3b, as shown in FIG. 2, includes a traveling inverter 7 for activating the traveling motor 6 for driving the article transporting carriage 3 for its traveling, an inter-carriage distance sensor 8 for detecting an inter-carriage distance relative to the other article transporting carriage 3, an inter-carriage optical transmission device 9 for communicating information with the other article transporting carriage 3, a salve controller 10 for controlling operations of the inter-carriage distance sensor 8 and the inter-carriage optical transmission device 9, a transfer inverter 11 for activating the transfer device 4, a group of sensors adapted for detecting e.g. a transfer condition of the article 20 on the transfer device 4, and an input/output device 13 for outputting detection information of these grouped sensors 12.

On the ground floor surface, there is provided a single ground controller 14 (controlling means) for controlling operations of the first article transporting carriage 3a and the second article transporting carriage 3b. And, this ground controller 14 controls the operations of the traveling inverters 7 and the transfer inverters 11 of the first article transporting carriage 3a and the second transporting carriage 3b.

As shown in FIG. 1, at each terminal end of the predetermined path 2, there is provided a position detecting sensor 15 for detecting the current position of the article transporting carriage 3 on the predetermined path 2 by detecting a distance from that predetermined path end to the article transporting carriage 3.

Though not shown, each one of the ground controller 14 provided on the ground, the traveling inverter 7, the slave controller 10, the transfer inverter 11 and the input/output device 13 includes a communication controller. And, there are provided a first optical transmission device 16 for transmitting/receiving information between the ground controller 14 and the first article transporting carriage 3a and a second optical transmission device 17 for transmitting/receiving information between the ground controller 14 and the second article transporting carriage 3b.

Each one of the various controllers and inverters described herein includes a CPU, a memory, a communication function all required for effecting respective functions described herein. Further, the controller includes an algorithm stored in its memory corresponding to the required functions.

And, the communication controller included in the ground controller 11, the communication controller included in the article transporting carriage 3 and the first optical transmission device 16 and the second optical transmission device 17 together constitute a communication network. In this communication network, the ground controller 14 is adapted to act as a "master", whereas the traveling inverter 7, the slave controller 10, the transfer inverter 11 and the input/output device 13 are adapted to act as "slaves", respectively.

The ground controller 11, while monitoring and controlling the current positions of the first article transporting carriage 3a and the second article transporting carriage 3b on the predetermined path 2, selects an article transporting carriage for requested article transport, based on transport request information requesting transport of an article 20 from a transport starting station to a transport destination station among the plurality of stations 1 and controls traveling of this selected carriage 3 for transporting the article 20 from the transport starting station to the transport destination station.

More particularly, under the control scheme of the ground controller 14, upon selection of the article transporting carriage for the requested transporting operation, first, the ground controller 14 causes this selected article transporting carriage 3 to travel to the transport starting station to receive the article 20 from this station and then causes this carriage 3 to the transport destination station to deliver the article 20 to this destination station, thus transporting the article 20 from the transport starting station to the transport destination station.

Incidentally, the transport request information can be inputted to the ground controller 11 via e.g. a manually operable input device such as a keyboard or from a host computer. The information designates, e.g. a transport starting station from which the article 20 is to be received and a transport destination station to which the article 20 is to be delivered.

Next, an article transporting operation will be described by taking for example a case where the first article transporting carriage 3a has been selected as the carriage for effecting a requested article transporting operation.

The ground controller 14 issues, via the communication network such as the first optical transmission device 16, traveling start instructing information indicating a traveling direction to the traveling inverter 7 of the first article transporting carriage 3a, whereby the first article transporting carriage 3a starts traveling. Thereafter, with lapse of a predetermined period, the ground controller 14 transmits, via the communication network, traveling speed instructing information indicating a target speed for the first article transporting carriage 3a to the traveling converter 7 of the first article transporting carriage 3a. Based on this speed instructing information received from the ground controller 14, the traveling converter 7 of the first article transporting carriage 3a causes the first article transporting carriage 3a to traveling while adjusting its traveling speed through adjustment of a current value to the traveling motor 6.

As the ground controller 14 is managing the traveling position of the first article transporting carriage 3a, when the traveling position of the first article transporting carriage 3a has reached a target stop position corresponding to either a transport starting station or a transport destination station, the ground controller 14 transmits, via the communication network, stop instructing information to the traveling inverter 7 of the first article transport carriage 3a. Then, upon this stop instructing information from the ground controller 14, the traveling inverter 7 of the first article transport carriage 3a stops the traveling motor 6 and applies a brake, thus stopping the first article transport carriage 3a at the target stop position.

While the first article transport carriage 3a is stopped at the target stop position, the ground controller 14 transmits, via the communication network, transfer instructing information to the transfer inverter 11 of the first article transport carriage 3a. Then, based on this transfer instructing information from the ground controller 14, the transfer converter 11 of the first article transport carriage 3a activates the transfer device 4 to receive/deliver the article 20 from the transport starting station or to the transport destination station.

The input/output device 13 is configured to transmit, via the communication network, the detection information from the sensor group 12 to the ground controller 14. Then, based on the information from the input/output device 13, the ground controller 14 confirms completion of the receiving or delivering of the article 20 from the transport starting station or to the transport destination station.

Next, selection of the article transporting carriage for effecting an article transporting operation will be described.

The ground controller 14 is configured to be capable of selectively executing a single carriage selecting mode for selecting, from the plurality of article transporting carriages 3, a single carriage for effecting a requested article transporting operation which single carriage is located adjacent the transport starting station designated by each article transport request information or a multiple carriage selecting mode for selecting a plurality of carriages for effecting requested article transporting operations.

The ground controller 14 is configured to select the multiple carriage selecting mode, under a multiple request condition in which a plurality of transport request information are being issued concurrently, with designating a same single station as the transport starting station AND in the absence of issuance of any other transport request information which designates a different transport starting station than the station designated by the plurality of transport request information.

The ground controller 14 is configured to select the single carriage selecting mode, under a single request condition in which a plurality of transport request information are being issued, with designating different stations, from the plurality of stations, as the transport starting stations or in a situation where there is being issued the multiple request condition AND in the presence of issuance of any other transport request information which designates a different transport starting station than the station designated by the plurality of transport request information.

For instance, the above-described multiple request condition tends to occur during certain hours of a day when a great number of article retrieval operations from article storage shelves article or storage operations to the article storage shelves are carried out in a concentrated manner.

Further, a mode instructing switch 21 is provided as a manual mode instructing means for instructing execution of the multiple carriage selecting mode. Then, when the execution of multiple carriage selecting mode is instructed by the mode instructing switch 21, the ground controller 14 executes the single carriage selecting mode and the multiple carriage selecting mode. And, when the execution of multiple carriage selecting mode is not instructed by the mode instructing switch 21, the ground controller 14 executes the single carriage selecting mode.

Figure 3:
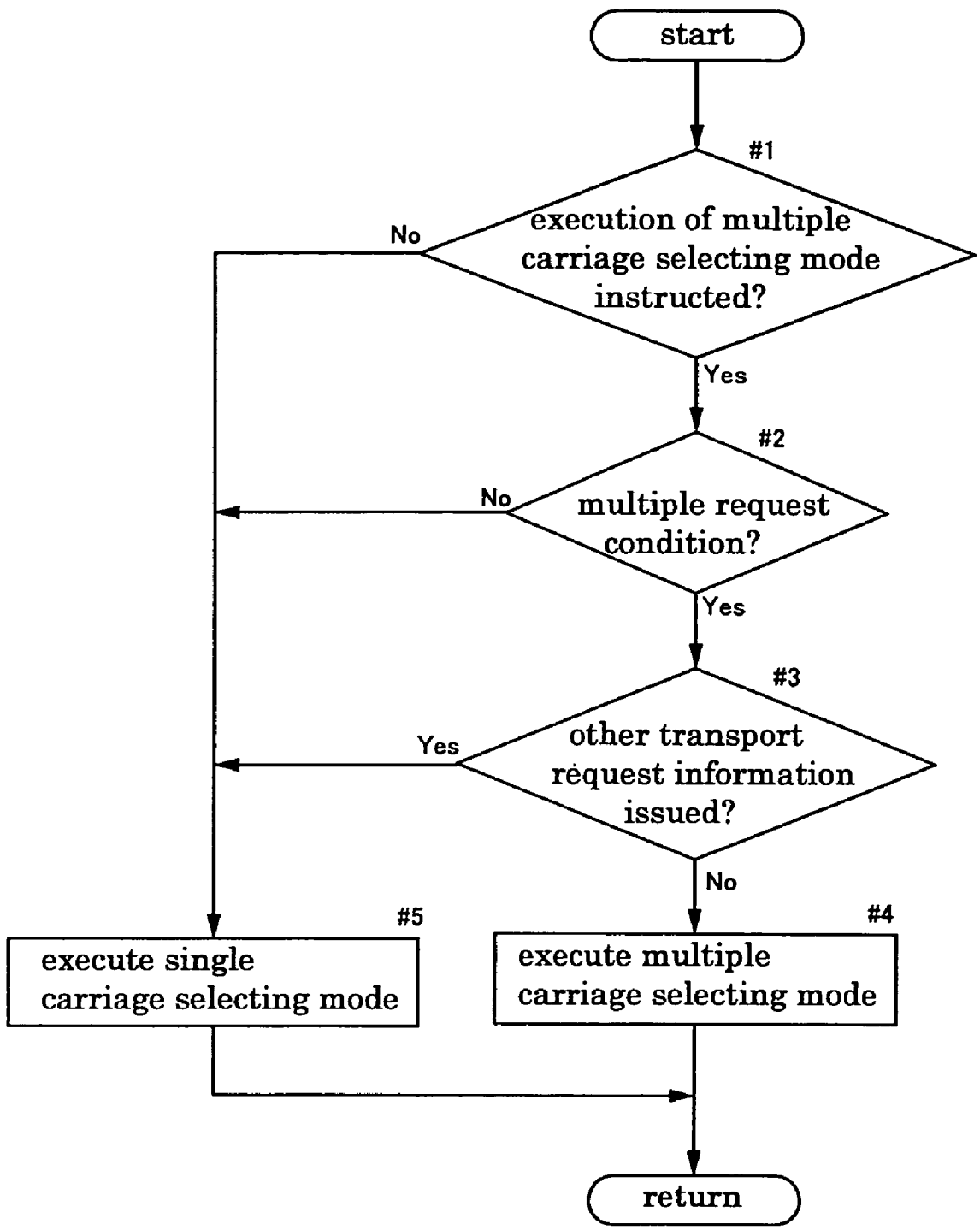
FIG. 3 is a flowchart illustrating operations by a ground controller.

Next, with reference to the flowchart in FIG. 3, there will be described which of the single carriage selecting mode or the multiple carriage selecting mode the ground controller 14 executes.

If there occurs a multiple request condition when the execution of multiple carriage selecting mode is instructed by the mode instructing switch 21, then, the ground controller 14 judges whether there is issued a further transport request information designating a different transport starting station than the transport starting station designated by the plurality of the transport request information or not (steps 1-3).

And, when the execution of the multiple carriage selecting mode is instructed by the mode selecting switch 21, if the present condition is a multiple request condition and there is issued no other transport request information, the ground controller 14 executes the multiple carriage selecting mode (step 4).

Further, when the execution of the multiple carriage selecting mode is not instructed by the mode selecting switch 21, if the present condition is the single request condition, not the multiple request condition, or there is issued a further transport request information, the ground controller 14 executes the single carriage selecting mode (step 5).

Next, the single carriage selecting mode will be explained.

In the single carriage selecting mode, the ground controller 14 selects, from the plurality of article transporting carriages 3, one article transporting carriage 3 positioned near the transport starting station designated by each transport request information, provided that the traveling range of this one selected carriage 3 does not interfere with that of another carriage 3 selected based on previously issued transport request information.

Next, additional explanation will be provided, regarding the mode of issuance of transport request information in the single carriage selecting mode.

Figure 4:
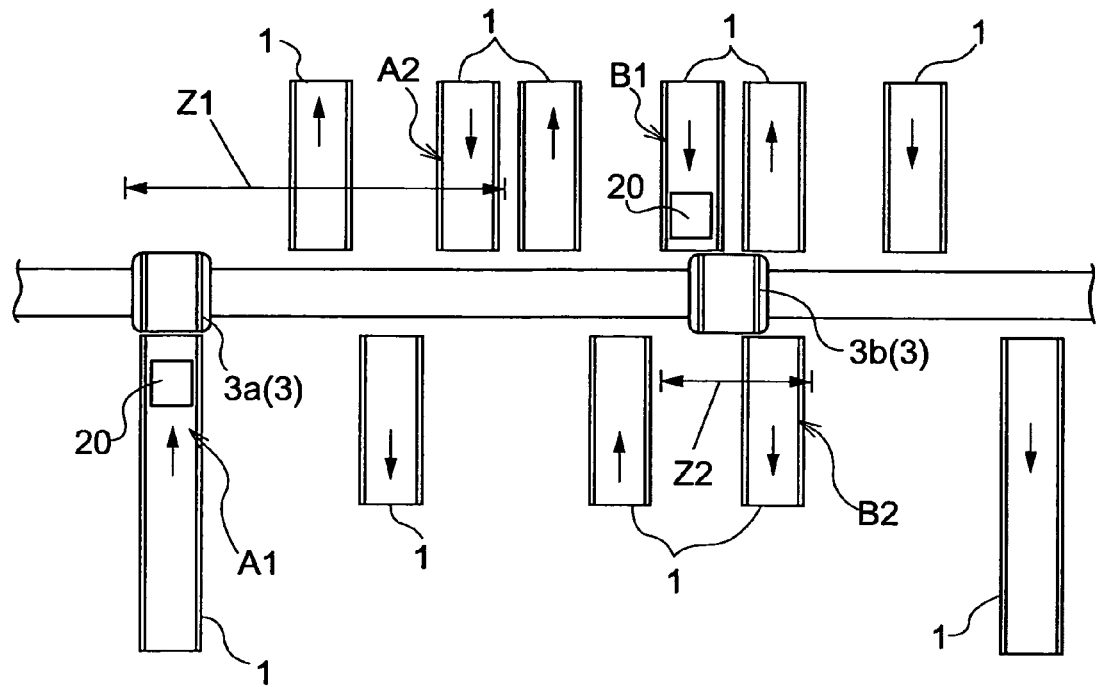
FIG. 4 is a plan view of the article transporting facility showing a transport request information issued situation.

First, as shown in FIG. 4, there will be explained a case where the first article transporting carriage 3a has been selected as the article transporting carriage in response to transport request information designating the transport starting station A1 and the transport destination station A2, after which another transport request information has issued, designating the transport starting station B1 and the transport destination station B2.

The traveling range of the article transport carriage selected for requested article transport can be obtained, based on the transport starting station, the transport destination station and the current position of this carriage. Therefore, the traveling range Z1 of the first article transporting carriage 3a selected in response to the previously issued article request information will be the range extending from the transport starting station A1 to the transport destination station A2. Further, near the transport starting station B1 designated by the subsequently issued transport request information, the second article transport carriage 3b is positioned. Then, supposing this second article transporting carriage 3b is selected in response to the transport request information designating the transport starting station B1 and the transport destination station B2, the traveling range Z2 of this second article transporting carriage 3b will be the range extending from the transport starting station B1 to the transport destination station B2.

In the above case, there is no interference between the traveling range Z1 of the first article transporting carriage 3a and the traveling range Z2 of the second article transporting carriage 3b. Therefore, the ground controller 14 selects the second article transporting carriage 3b for effecting an article transporting operation requested by the transport request information designating the transport starting station B1 and the transport destination station B2.

Then, upon selection of the second article transporting carriage 3b for effecting the article transporting operation, the ground controller 14 causes this second article transporting carriage 3b to travel in order to transfer the article 20 from the transport starting station B1 to the transport destination station B2.

Next, there will be explained another case illustrated in FIG. 5. In this case, the first article transporting carriage 3a has been selected as the article transporting carriage in response to transport request information designating the transport starting station C1 and the transport destination station C2, after which another transport request information has issued, designating the transport starting station D1 and the transport destination station D2.

In this case too, like the case illustrated in FIG. 4, the first article transporting carriage 3a has been selected as the article transporting carriage in response to the previously issued transport request information. Then, it may be conceivable to select the second article transporting carriage 3b for effecting an article transporting operation requested by the subsequently issued transport request information.

In this case, however, there exists interference between the traveling range Z1 of the first article transporting carriage 3a and the traveling range Z2 of the second article transporting carriage 3b. Therefore, the ground controller 14 does not execute the selection of article transporting carriage, until completion of the article transporting operation by the first article transporting carriage 3a.

And, if the current position of the second article transporting carriage 3b interferes with the traveling range of the first article transporting carriage 3a, the ground controller 14 causes the second article transporting carriage 3b to travel to a position not interfering with the traveling range of the first article transporting carriage 3a. Also, if the current position of the second article transporting carriage 3b does not interfere with the traveling range of the first article transporting carriage 3a, the ground controller 14 causes the second article transporting carriage 3b to stand by at the current position.

Figure 5:
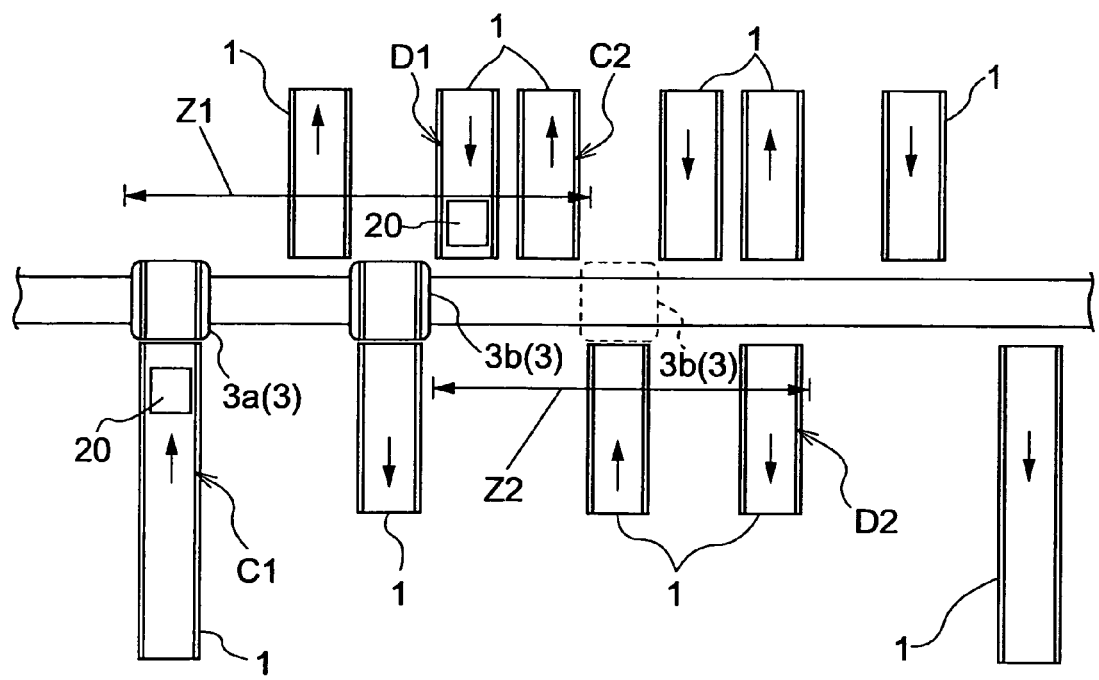
FIG. 5 is a plan view of the article transporting facility showing a transport request information issued situation.

In the case illustrated in FIG. 5, the current position of the second article transporting carriage 3b is interfering with the traveling range of the first article transporting carriage 3a. Therefore, the ground controller 14 causes the second article transporting carriage 3b to travel to a station 1 near the current position out of the traveling range of the first article transporting carriage 3a, as shown by dot lines in FIG. 5.

Figure 6:
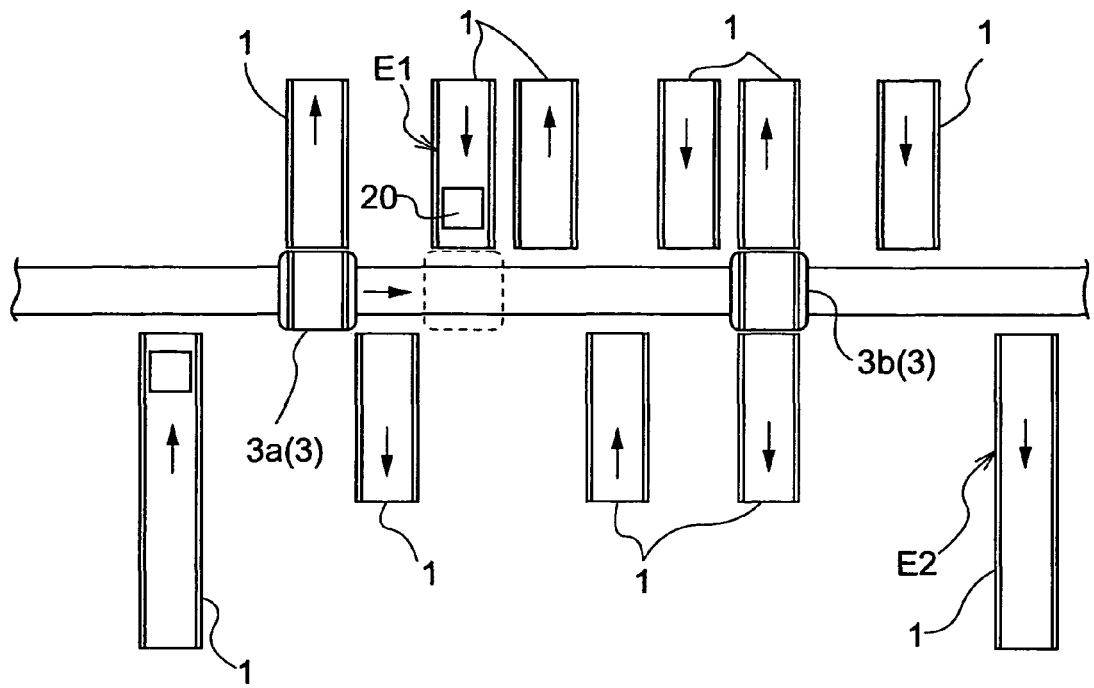
FIG. 6 is a plan view of the article transporting facility showing a transport request information issued situation.

Next, there will be described a case wherein one transport request information has issued designating a transport starting station E1 and a transport destination station E2 as shown in FIG. 6.

In this case, of the two carriages, i.e. the first article transporting carriage 3a and the second article transporting carriage 3b, the first article transporting carriage 3a is positioned closer to the transport starting station 1. Therefore, the ground controller 14 selects this first article transporting carriage 3a for effecting an article transporting operation requested by the transport request information designating the transport starting station E1 and the transport designating station E2.

Then, upon selection of the first article transporting carriage 3a for effecting the article transporting operation, the ground controller 14 causes this first article transporting carriage 3a to travel in order to transfer the article 20 from the transport starting station E1 to the transport destination station E2.

Further, though not shown, in case more than three transport request information have been issued, one of the operations described above with references to one of FIGS. 4-6, will be effected in repetition. That is, with the provision of absence of interference with the traveling range of an article transporting carriage selected in response to the previously issued transport request information, the ground controller 14 executes the operation of selecting, from the plurality of article transporting carriages 3, one article transporting carriage for effecting a requested article transporting operation which carriage is located near the transport starting station designated by subsequently issued transport request information, in repetition according to the order of issuances of the plurality of transport request information.

Next, the multiple carriage selecting mode will be described.

Figure 7:
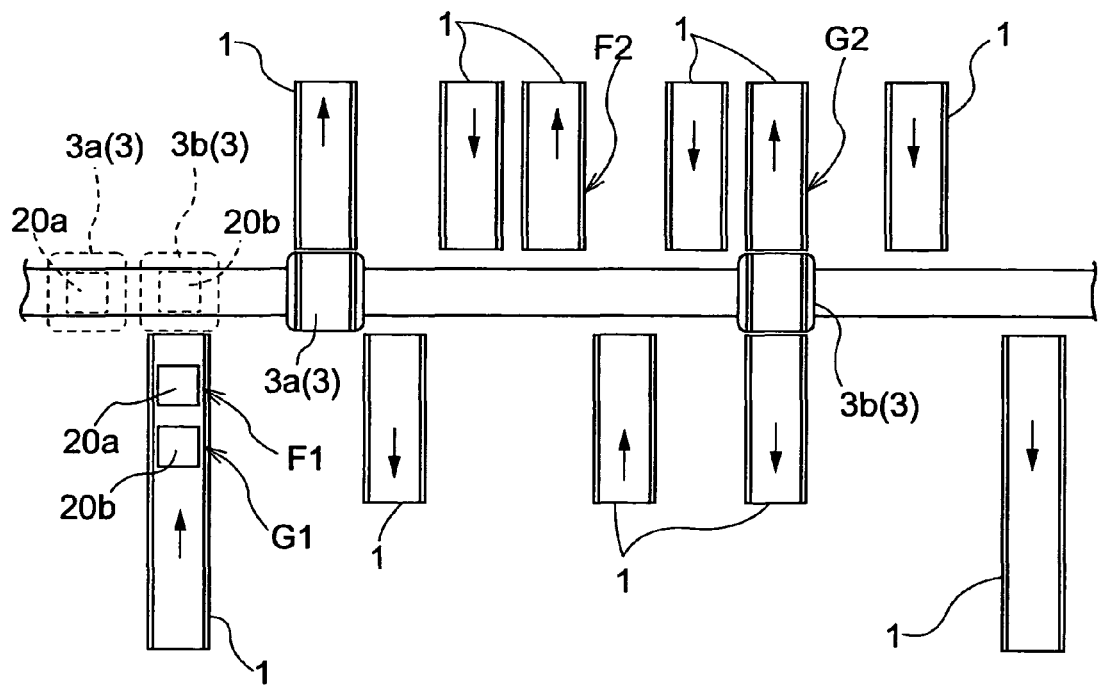
FIG. 7 is a plan view of the article transporting facility showing a transport request information issued situation.

FIG. 7 shows a first type of multiple request condition involving coincidence of two transport request information both designating a single same station 1, namely, first transport request information requesting transport of an article 20a from a transport starting station F1 to a transport destination station F2 and second transport request information requesting transport of an article 20b from a transport starting station G1 to a transport destination station G2.

In this case, the transport destination station F2 of the first transport request information and the transport destination station G2 of the second transport request information are located on the same side along the length of the predetermined path 2, relative to the transport starting stations F1, G1.

Then, the ground controller 14 effects the selection, from the plurality of article transporting carriages, of the article transporting carriage for each one of transport request information, in such a manner that the positional order of the plurality of transport starting stations F2, G2 along the length of the predetermined path 2 may agree with the positional order of the plurality of article transporting carriages.

More particularly, referring to the positional order of the two article transporting carriages 3 along the length of the predetermined path 2, the first article transporting carriage 3a is located closer to the transport starting stations F1, G1 than the second article transporting carriage 3b is. And, referring to the positional order of the transport starting station F2 of the first transport request information and the transport starting station G2 of the second transport request information, the transport starting station F2 of the first transport request information is located closer to the transport starting stations F1, G1 than the transport starting station G2 of the second transport request information is.

Therefore, the ground controller 14 selects the first article transporting carriage 3a as the carriage for effecting the article transporting operation in response to the first transport request information and selects the second article transporting carriage 3b as the carriage for effecting the article transporting operation in response to the second transport request information, respectively.

Next, there will be described operations of the article transporting carriages which are effected with the above-described selections of the carriages.

As shown by the dot lines in FIG. 7, under the control scheme of the ground controller 14 for the article transporting carriages 3, the controller 14 causes the first article transporting carriage 3a to travel first to the transport starting station F1 to receive the article 20a and then to a siding position corresponding to the carry-in station 1a. After this, the controller 14 causes the second article transporting carriage 3b to travel to the transport starting station G1 to receive the article 20b.

Thereafter, the ground controller 14 further controls the operations of the article transporting carriages 3 in order to effect, in parallel, an operation of causing the second article transporting carriage 3b to travel to the transport destination station G2 of the second transport request information to deliver the article 20b and a further operation of causing the first article transporting carriage 3a to travel to the transport destination station F2 of the first transport request information to deliver the article 20a.

Next, the above-described siding position will be explained in details.

This siding position is predetermined in correspondence with each station 1, such that as an article transporting carriage 3 is moved to this siding position, another article transporting carriage 3 is allowed to travel to that station 1. For instance, as show in FIG. 7, for a station 1 located near an end of the length of the predetermined path 2, the sidling station corresponding thereto is set even closer to that end of the length of the predetermined path 2. For each of the other stations 1, a station 1 adjacent thereto along the length of the predetermined path 2 is set as its corresponding sidling position.

Figure 8:
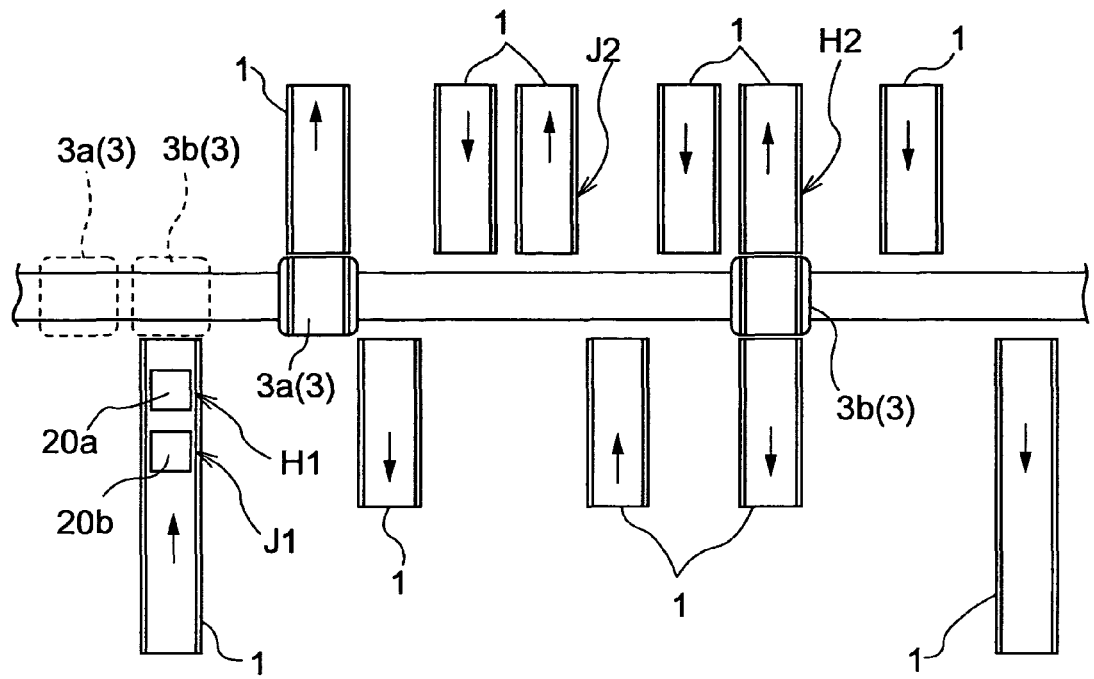
FIG. 8 is a plan view of the article transporting facility showing a transport request information issued situation.

FIG. 8 shows a second type of multiple request condition also involving coincidence of two transport request information both designating a single same station 1, namely, first transport request information requesting transport of an article 20a from a transport starting station H1 to a transport destination station H2 and second transport request information requesting transport of an article 20b from a transport starting station J1 to a transport destination station J2.

In this case, the transport destination station H2 of the first transport request information and the transport destination station J2 of the second transport request information are located on the same side along the length of the predetermined path 2, relative to the transport starting stations H1, J1.

Then, the ground controller 14 effects the selection, from the plurality of article transporting carriages, of the article transporting carriage for each one of transport request information, in such a manner that the positional order of the plurality of transport starting stations H2, J2 along the length of the predetermined path 2 may agree with the positional order of the plurality of article transporting carriages 3.

More particularly, referring to the positional order of the transport starting station H2 of the first transport request information and the transport starting station J2 of the second transport request information, the transport starting station J2 of the second transport request information is located closer to the transport starting stations 1a, G1 than the transport starting station H2 of the first transport request information is.

Therefore, the ground controller 14 selects the second article transporting carriage 3b as the carriage for effecting the article transporting operation in response to the first transport request information and selects the first article transporting carriage 3a as the carriage for effecting the article transporting operation in response to the second transport request information, respectively.

Next, there will be described operations of the article transporting carriages which are effected with the above-described selections of the carriages.

As shown by the dot lines in FIG. 8, under the control scheme of the ground controller 14 for the article transporting carriages 3, the controller 14 causes the first article transporting carriage 3a to travel first to the transport starting station J1 and then causes the second article transporting carriage 3b to travel to the transport starting station H2.

Then, after the second article transporting carriage 3b receives the article 20a from the transport starting station H1, this second article transporting carriage 3b is caused to travel to the transport destination station H2 of the first transport request information to deliver the article 20a thereto.

Then, under the further control of the ground controller 14, as the second article transporting carriage 3b travels toward the transport destination station H2 of the first transport request information, the first article transporting carriage 3a is caused to travel to the transport starting station J1 to receive the article 20b and then travel to the transport destination station J2 to deliver the article 20b thereto.

Figure 9:
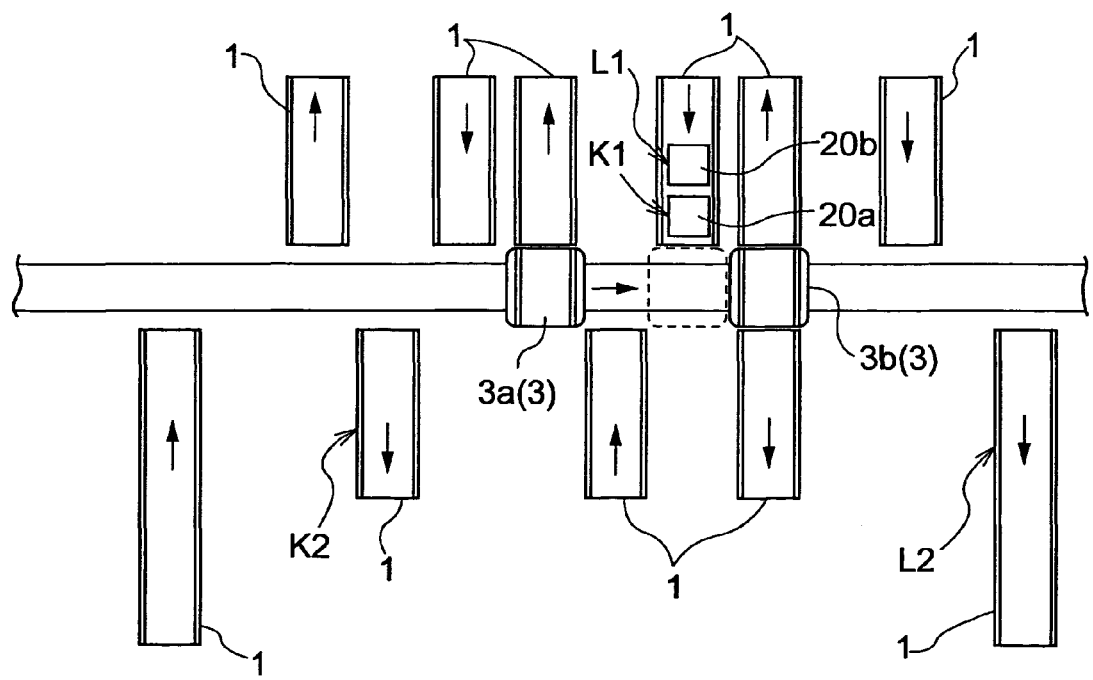
FIG. 9 is a plan view of the article transporting facility showing a transport request information issued situation.

FIG. 9 shows a third type of multiple request condition also involving coincidence of two transport request information both designating a single same station 1, namely, first transport request information requesting transport of an article 20a from a transport starting station K1 to a transport destination station K2 and second transport request information requesting transport of an article 20b from a transport starting station L1 to a transport destination station L2.

In this case, the transport destination station K2 of the first transport request information and the transport destination station L2 of the second transport request information are located on the opposite sides along the length of the predetermined path 2, relative to the transport starting stations K1, L1.

Then, the ground controller 14 effects the selection of an article transporting carriage, from the plurality of carriages, for each of the plurality of transport request information as follows. Namely, for a transport request information included in the plurality of transport request information, which designates a transport starting station located on one side along the length of the predetermined path 2 and a transport destination station located on the same one side, the ground controller 14 selects, from the plurality of article transporting carriages 3, one article transporting carriage located on that one side, in the positional order of these carriages 3, along the length of the predetermined path 2. Whereas, for a transport request information included in the plurality of transport request information, which designates a transport starting station located on the other side along the length of the predetermined path 2 and a transport destination station located on the same other side, the ground controller 14 selects, from the plurality of article transporting carriages 3, one article transporting carriage located on that other side, in the positional order of these carriages 3, along the length of the predetermined path 2.

More particularly, in the positional order of the plurality of article transporting carriages 3, the first article transporting carriage 3a is located on one end side (left side in FIG. 9) along the length of the predetermined path 2, whereas the second article transporting carriage 3b is located on the other end side (right side in FIG. 9) along the length of the predetermined path 2. And, along the length of the predetermined path 2, the transport destination station K2 of the first transport request information is located on the one end side (left side in FIG. 9) relative to the transport starting stations K1, L1, whereas the transport destination station L2 of the second transport request information is located on the other end side (right side in FIG. 9) relative to the transport starting stations K1, L1.

Therefore, the ground controller 14 selects the first article transporting carriage 3a as the carriage for effecting the article transporting operation in response to the first transport request information and selects the second article transporting carriage 3b as the carriage for effecting the article transporting operation in response to the second transport request information, respectively.

Next, there will be described operations of the article transporting carriages which are effected with the above-described selections of the carriages.

As shown by the dot lines in FIG. 9, under the control scheme of the ground controller 14 for the article transporting carriages 3, the controller 14 causes the first article transporting carriage 3a to travel first to the transport starting station K1 to receive the article 20a and then travel to the transport starting station K2 to deliver the article 20a thereto.

Then, under the further control of the ground controller 14, as the first article transporting carriage 3a travels toward the transport destination station K2, the second article transporting carriage 3b is caused to travel to the transport starting station L1 to receive the article 20b and then travel to the transport destination station L2 to deliver the article 20b thereto.

Figure 10:
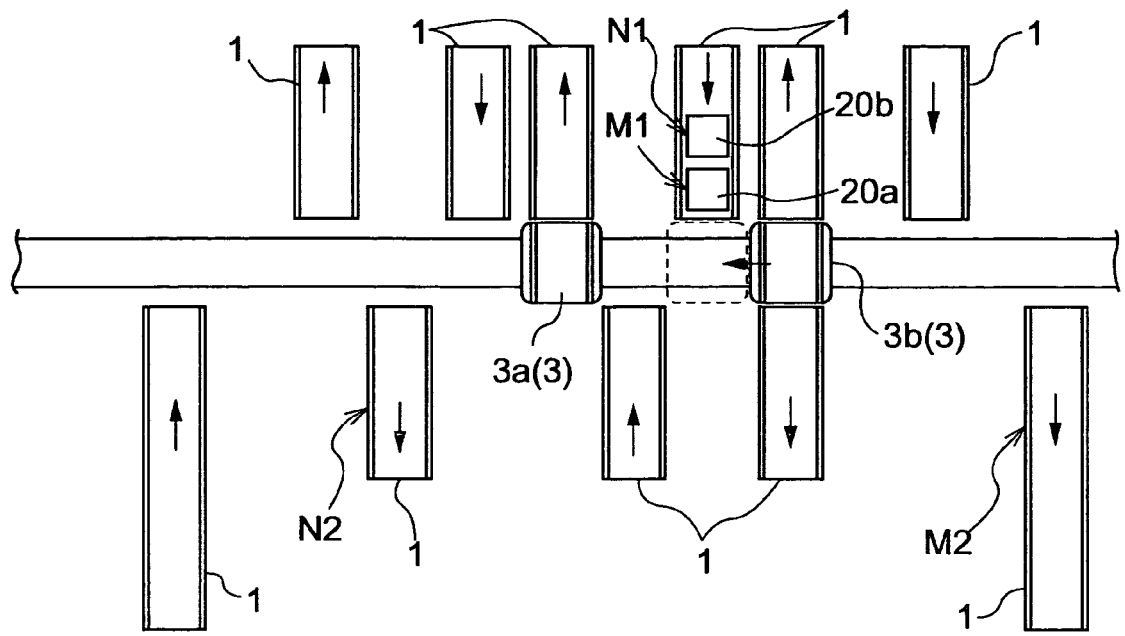
FIG. 10 is a plan view of the article transporting facility showing a transport request information issued situation.

FIG. 10 shows a fourth type of multiple request condition also involving coincidence of two transport request information both designating a single same station 1, namely, first transport request information requesting transport of an article 20a from a transport starting station M1 to a transport destination station M2 and second transport request information requesting transport of an article 20b from a transport starting station N1 to a transport destination station N2.

In this case, the transport destination station M2 of the first transport request information is located on the other end side (right side in FIG. 9) and the transport destination station N2 of the second transport request information is located on the one end side (left side in FIG. 9) along the length of the predetermined path 2, relative to the transport starting stations M1, N1.

Therefore, the ground controller 14 selects the second article transporting carriage 3b as the carriage for effecting the article transporting operation in response to the first transport request information and selects the first article transporting carriage 3a as the carriage for effecting the article transporting operation in response to the second transport request information, respectively.

In the case of the above-described selections of the article transporting carriages for effecting the article transporting operations, conversely from the case illustrated in FIG. 9, the ground controller 14 controls that operations of the article transporting carriages 3 in such a manner that the controller effects first the transport of the article 20a by the second article transporting carriage 3b from the transport starting station M1 to the transport destination station M2 designated by the first transport request information and the controller then effects the transport of the article 20b by the first article transporting carriage 3a from the transport starting station N1 to the transport destination station N2 designated by the second transport request information.

Each of the first article transporting carriage 3a and the second article transporting carriage 3b includes the inter-carriage distance sensor 8 and the slave controller 10, which are provided independently of the ground controller 14. With these, collision between the article transporting carriages 3 can be avoided even if an abnormality such as an overrun occurs in the ground controller 14.

Namely, the slave controller 10 monitors an inter-carriage distance between the article transporting carriages 3, based on detection information from the inter-carriage distance sensor 8, so that in the event of possibility of collision between the article transporting carriages 3, the carriages 3 are stopped forcibly.

More particularly, when the inter-carriage distance falls below a predetermined inter-carriage distance, the slave controller 10 activates a power stopping means 18 for stopping power supply to the traveling motor 6, thus stopping power supply to the traveling motor 6, hence, stopping the article transporting carriages 3.

And, the slave controller 10 transmits, via the inter-carriage optical transmission device 9, stop instructing information to the slave controller 10 of the other article transporting carriage 3, so as to stop this carriage 3. Hence, upon receipt of this stop instructing information, the latter slave controller 10 activates the power stopping means 18 to stop power supply to the traveling motor 6, whereby the other article transporting carriage 3 is stopped forcibly.

In this way, when the inter-carriage distance falls below a predetermined inter-carriage distance, the first article transporting carriage 3a and the second article transporting carriage 3b are stopped, thus preventing collision between these carriages 3a. Incidentally, the predetermined inter-carriage distance will be varied, depending on whether the first article transporting carriage 3a and the second article transporting carriage 3b travel in a same direction or in opposite directions.

Second Embodiment

Next, a second embodiment of the present invention will be described. This is a further embodiment relating to the condition of determining whether to execute the multiple carriage selecting mode or the single carriage selecting mode, described in the first embodiment; Therefore, this condition difference will be described in details, with description of the rest of the construction being omitted.

In the first embodiment described above, the multiple carriage selecting mode is executed when the two conditions are met, namely, the multiple request condition, plus the further condition of absence of other transport request information designating a different transport starting station than the transport starting station designated by the plurality of transport request information. In the case of this second embodiment, however, the multiple carriage selecting mode is executed when only the one condition, i.e. the multiple request condition, is met.

That is to say, under the multiple request condition, the ground controller 14 is configured to execute the multiple carriage selecting mode, regardless of presence or absence of other transport request information designating a different transport starting station than the transport starting station designated by the plurality of transport request information.

Figure 11:
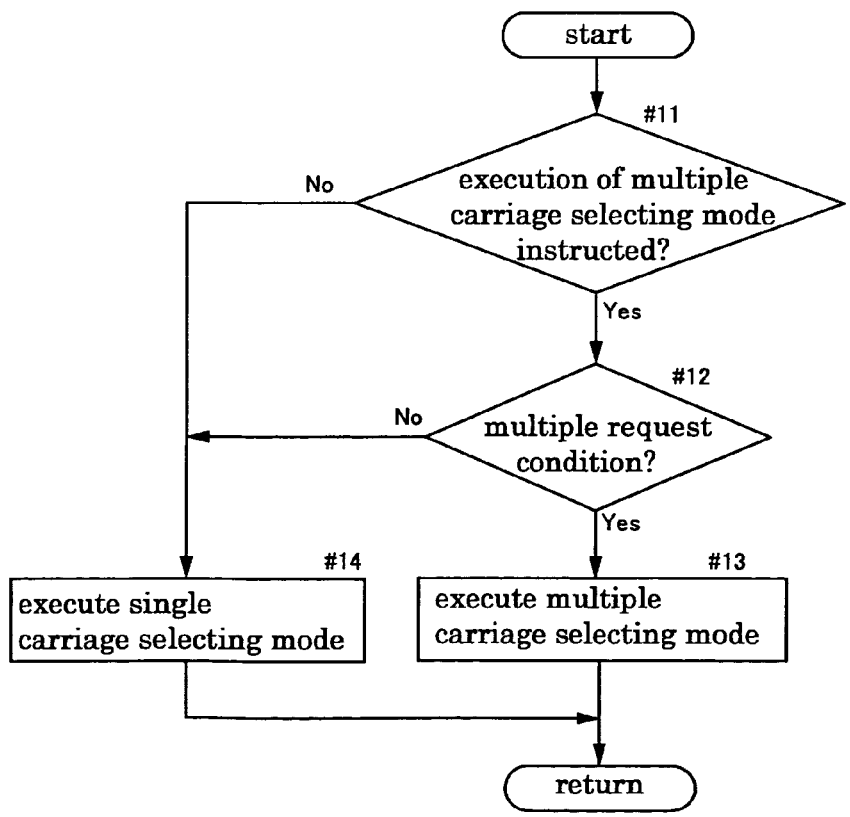
FIG. 11 is a flowchart illustrating operations by a ground controller.

Next, with reference to the flowchart of FIG. 11, there will be explained whether the ground controller 14 executes the single carriage selecting mode or the multiple carriage selecting mode.

When the execution of the multiple carriage selecting mode is instructed by the mode instructing switch 21, the ground controller 14 executes the multiple carriage selecting mode in the event of the multiple request condition (steps 11-13).

Further, the ground controller 14 executes the single carriage selecting mode if the execution of the multiple carriage selecting mode is not instructed by the mode instructing switch 21, or in the event of the single request condition, not the multiple request condition (step 14).

Figure 12:
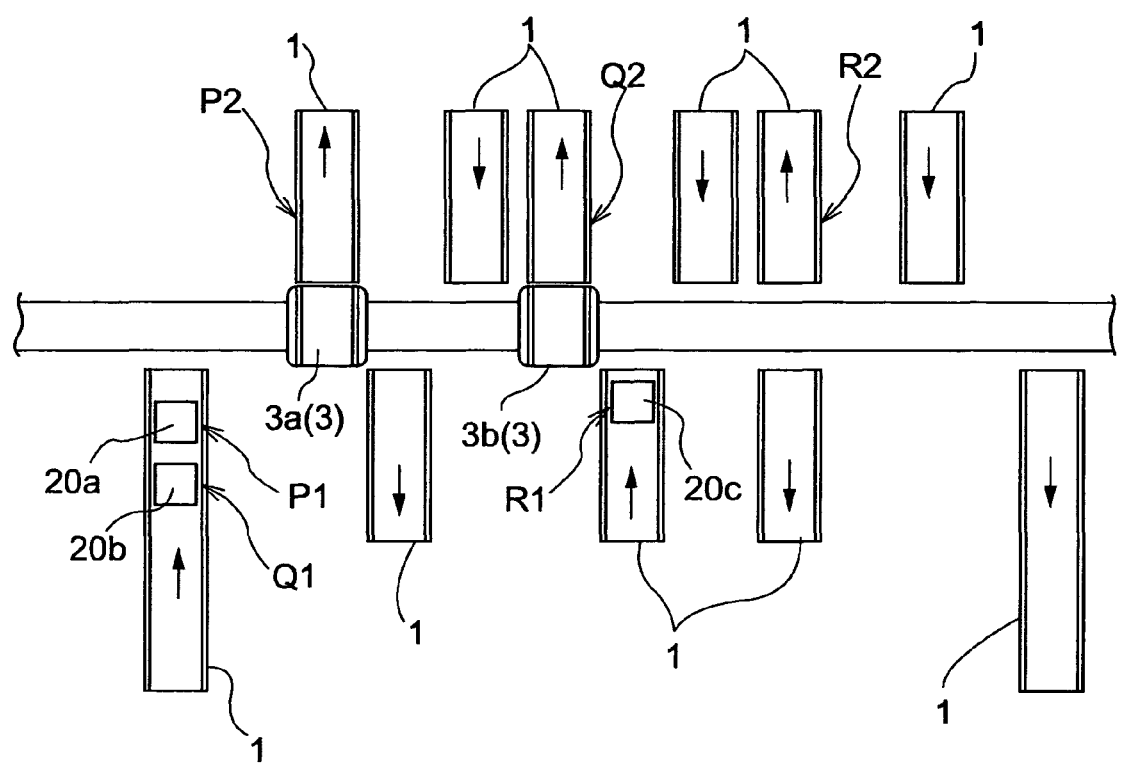
FIG. 12 is a plan view of the article transporting facility showing a transport request information issued situation.

With reference to FIG. 12, there will be described a case of coincidence of three transport request information, namely, first transport request information designating a transport starting station P1 and a transport destination station P2, second transport request information designating a transport starting station Q1 and a transport destination station Q2 and third transport request information designating a transport starting station R1 and a transport destination station R2.

As the transport starting station P1 designated by the first transport request information and the transport starting station Q1 designated by the second transport request information belong to a same single station. The multiple request condition exists. On the other hand, there is issued the third transport request information designating the transport starting station R1 which is different from either of the transport starting stations P1, Q1 of the first and second transport request information.

In this situation, the ground controller 14 executes the multiple carriage selecting mode. More particularly, the ground controller 14 executes the multiple carriage selecting mode for the first transport request information and the second transport request information and executes also the single carriage selecting mode for the third transport request information.

As described above, in the case of transport request information issuance condition illustrated in FIG. 12, the ground controller 14 executes the multiple carriage selecting mode and the single carriage selecting mode. The controller determines which of the multiple carriage selecting mode and the single carriage selecting mode is to be effected, based on the order of issuance of the transport request information.

For instance, in the case of the issuance order of the first transport request information, the second transport request information and then the third transport request information, the ground controller 14 executes first the multiple carriage selecting mode for the first transport request information and the second transport request information and then executes the single carriage selecting mode for the third transport request information.

In the further case of the issuance order of the third transport request information, the first transport request information and then the second transport request information, the ground controller 14 executes first the single carriage selecting mode for the third transport request information and then executes the multiple carriage selecting mode for the first transport request information and the second transport request information.

In the still further case of the issuance order of the first transport request information, the third transport request information and then the second transport request information, the ground controller 14 executes first the multiple carriage selecting mode for the first transport request information and the second transport request information and then executes the single carriage selecting mode for the third transport request information. Alternatively, the ground controller 14 executes first the single carriage selecting mode for the third transport request information and then executes the multiple carriage selecting mode for the first transport request information and the second transport request information. The selection between these two modes of execution order can be made, based on various appropriate selection conditions, such as which of the first or third transport request information should be given priority over the other, which of the transport starting station of the first transport starting station or the transport starting station of the third transport request information the article transporting carriage 3 is currently positioned nearby.

Other Embodiments (1) In the first and second embodiments described above, the mode instructing switch 21 is provided. So that, when this mode instructing switch 21 instructs execution of the multiple carriage selecting mode, the ground controller 14 executes the single carriage selecting mode and the multiple carriage selecting mode. And, when the mode instructing switch 21 does not instruct execution of the multiple carriage selecting mode, the ground controller 14 executes the single carriage selecting mode. However, the invention may be embodied without providing such mode instructing switch 21.

(2) In the first and second embodiments described above, the article transporting carriage 3 is not equipped with any carriage controllers for controlling various equipments such as the traveling motor, the transfer device 4, etc. Rather, the ground controller 14 issues various traveling instructing information such as the traveling starting instructing information and the traveling speed instructing information to the traveling inverter 7. Instead, the article transporting carriage 3 may be equipped with such carriage controllers for controlling various equipments such as the traveling motor, the transfer device 4, etc, whereas the ground controller 14 may be configured to instruct only start of traveling to the carriage controllers so that these carriage controllers control the operations of the traveling motor and the transfer device 4.

(3) In the first and second embodiments described above, the ground controller 14 is configured to monitor and manage the positions of the plurality of article transporting carriages 3 on the predetermined path 2, based on the detection information from the position sensor 15. Instead, each one of the article transporting carriages 3 may include an encoder, such that detection information of this encoder is transmitted by the input/output device 13 to the ground controller 14, thus allowing this ground controller 14 to monitor/manage the positions of the plurality of article transporting carriages 3 on the predetermined path 2.

(4) In the first and second embodiments described above, there has been described the particular layout shown in FIG. 1 as the disposing arrangement of the stations 1. Any other layout may be employed. The number of stations 1 and the layout of these stations 1 may be varied in any convenient manner.

(5) In the first and second embodiments described above, each one of the two article transporting carriages 3 is equipped with the inter-carriage distance sensor 8 and the slave controller 10. Instead, the inter-carriage distance sensor 8 and the slave controller 10 may be provided only in one of the two article transporting carriages 3. So that, if the inter-carriage distance falls below the predetermined inter-distance range, thus providing possibility of collision with the other carriage, the inter-carriage optical transmission device 9 may communicate this possibility of collision to the other article transporting carriage 3, so that the other article transporting carriage 3 may be stopped by this communication.

(6) In the first and second embodiments described above, the article transporting carriage 3 includes the transfer device 4. Instead, the article transfer device may be provided in the station 1, rather than in the article transporting carriage 3.

(7) In the first and second embodiments described above, two article transporting carriages 3 are provided. However, the number of article transporting carriages 3 may be varied conveniently.

(8) In the first and second embodiments described above, there are provided the article transporting carriages 3. Instead, predetermined paths may be provided between an adjacent pair of article storing shelves spaced part from each other and along the width direction of these shelves and as such article transporting carriages, stacker cranes may be provided to travel back and forth on such predetermined path. In this way, the present invention may be applied to various types of article transporting carriages.

The invention claimed is:

1. An article transporting facility comprising:
a single predetermined path disposed along a plurality of article transfer locations and having a first end and a second end;
a predetermined number of article transporting carriages traveling in two opposing directions on the predetermined path;
controlling means for individually controlling traveling of the predetermined number of article transporting carriages in both directions on the predetermined path while maintaining a sequential positional order with respect to one of the first end and the second end of the predetermined path, the controlling means configured to execute a single carriage selecting mode and a multiple carriage selecting mode;
wherein based on article transport request information for transporting an article from an original article transfer location to a destination article transfer location among the plurality of article transfer locations, the controlling means controls the traveling of the transporting carriages such that the controller selects a single article transporting carriage from the predetermined number of article transporting carriages for causing the selected carriage to transfer the article from the original article transfer location to the destination article transfer location;
wherein in the single carriage selecting mode, the controlling means selects an article transporting carriage from the plurality of article transporting carriages to transport an article from an original article transfer location to a destination article transfer location among the plurality of article transfer locations based upon a proximity between the selected carriage and the original article transfer location, and operates a selected article transporting carriage to perform an article transfer operation unless a traveling range of the selected article transporting carriage interferes with a traveling range or position of another article transporting carriage, and
when a multiple request condition exists wherein a plurality of transport request information designating a same single article transfer location as the original article transfer location are issued, the controlling means executes a multiple carriage selecting mode wherein the controlling means selects a plurality of article transporting carriages from the predetermined number of article transporting carriages for article transport from the original article transfer location to a plurality of destination article transfer locations,
wherein in said multiple carriage selecting mode, said controlling means selects, from the predetermined number of article transporting carriages, the plurality of article transporting carriages for the respective plurality of transport request information, based on a position of each of the plurality of destination article transfer locations of the plurality of transport request information relative to a position of the original article transfer location along the length of said predetermined path,
wherein in said multiple carriage selecting mode, if all of the transport destination transfer locations of the plurality of transport request information are located in a same traveling direction with respect to the original article transfer location, said controlling means selects a respective one of the plurality of article transporting carriages for a respective one of the plurality of transport request information, in such a manner that the positional order of the plurality of destination article transfer locations along the length of the predetermined path relative to an end of the predetermined path agrees with the positional order, along the length of the predetermined path, of the plurality of article transporting carriages relative to the same end of the predetermined path, and wherein in the multiple carriage selecting mode, the controlling means operates the plurality of article transporting carriages to perform respective article transfer operations to transport the multiple respective articles from the single original article transfer location to the multiple respective article transfer locations and in a manner to avoid collisions between the plurality of article transporting carriages.

2. The article transporting facility according to claim 1, wherein in said multiple carriage selecting mode, if the transport destination transfer locations of the plurality of transport request information are located in different traveling directions with respect to the original article transfer location, said controlling means selects, from the predetermined number of article transporting carriages, an article transporting carriage located closer to a first end of the predetermined path in the positional order of the carriages for the transport request information designating a destination article transfer location located in a traveling direction toward the first end relative to an original article transfer location; whereas, said controlling means selects, from the predetermined number of article transporting carriages, an article transporting carriage located closer to a second end of the predetermined path in the positional order of the carriages for the transport request information designating a destination article transfer location located in a traveling direction toward the second end relative to the original article transfer location.

3. The article transporting facility according to claim 1, wherein either when a plurality of transport request information designating different original article transfer locations from the plurality of article transfer locations are issued, or when a single request condition exists wherein one transport request information is issued, said controlling means executes a single carriage selecting mode for selecting, as the article transporting carriage for the article transport from the predetermined number of article transporting carriages, one article transporting carriage located near the original article transfer location for the transport request information.

4. The article transporting facility according to claim 3, wherein when said multiple request condition exists in the absence of any other transport request information designating a different transport starting article transfer location than the original article transfer location designated by the plurality of transport request information, said controlling means executes said multiple carriage selecting mode; and when said single request condition exists, or when the multiple request condition exists in the presence of other transport request information designating a different transport starting article transfer location than the original article transfer location designated by the plurality of transport request information, said controlling means executes said single carriage selecting mode.

5. The article transporting facility according to claim 3, wherein when said multiple request condition exists, said controlling means executes the multiple carriage selecting mode, regardless of presence or absence of other transport request information designating a different transport starting article transfer location than the original article transfer location designated by the plurality of transport request information.

6. The article transporting facility according to claim 3, further comprising a manual mode instructing means for instructing execution of said multiple carriage selecting mode; and said controlling means executes said single carriage selecting mode and said multiple carriage selecting mode when said mode instructing means instructs execution of the multiple carriage selecting mode; and said controlling means executes said multiple carriage selecting mode when said mode instructing means does not instruct the execution of the multiple carriage selecting mode.

7. The article transporting facility according to claim 1, wherein at least one of the article transfer locations comprises article storage shelf including a plurality of storage compartments.

8. A method of controlling an article transporting facility having a single predetermined path disposed along a plurality of article transfer locations and having a first end and a second end, a predetermined number of article transporting carriages traveling in two opposing directions on the predetermined path and controlling means for individually controlling traveling of the predetermined number of article transporting carriages in both directions on the predetermined path while maintaining a sequential positional order with respect to one of the first end and the second end of the predetermined path, the controlling means configured to execute a single carriage selecting mode and a multiple carriage selecting mode; wherein based on article transport request information for transporting an article from an original article transfer location to a destination article transfer location among the plurality of article transfer locations, the traveling of the transporting carriages is controlled such that a single article transporting carriage from the predetermined number of article transporting carriages is selected to transfer the article from the original article transfer location to the destination article transfer location; the method comprising the steps of:

either when a plurality of transport request information designating different original article transfer locations from the plurality of article transfer locations are issued, or when a single request condition exists wherein one transport request information is issued, executing the single carriage selecting mode wherein the controlling means selects an article transporting carriage from the plurality of article transporting carriages to transport an article from an original article transfer to a destination article transfer location among the plurality of article transfer locations based upon a proximity between the selected carriage and the orignal article transfer location, and operating a selected article transporting carriage to perform an article transfer operation unless a traveling range of the selected article transporting carriage interferes with a traveling range or position of another article transporting carriage;

executing the multiple carriage selecting mode wherein the controlling means selects a plurality of article transporting carriages from the predetermined number of article transporting carriages for article transport to a plurality of destination article transfer locations when a multiple request condition exists wherein a plurality of transport request information designating a same single article transfer location as the original article transfer location are issued, wherein the step of executing a multiple carriage selecting mode includes selecting, from the predetermined number of article transporting carriages, the plurality of article transporting carriages for the respective plurality of transport request information, based on a position of each of the plurality of destination article transfer locations of the plurality of transport request information relative to a position of the original article transfer location along the length of said predetermined path, wherein the step of executing a multiple carriage selecting mode includes, if all of the transport destination transfer locations of the plurality of transport request information are located in a same traveling direction with respect to the original article transfer location, selecting a respective one of the plurality of article transporting carriages for a respective one of the plurality of transport request information, in such a manner that the positional order of the plurality of destination article transfer locations along the length of the predetermined path relative to an end of the predetermined path agrees with the positional order, along the length of the predetermined path, of the plurality of article transporting carriages relative to the same end of the predetermined path; and operating, in the multiple carriage selecting mode, the plurality of article transporting carriages to perform respective article transfer operations to transport the multiple respective articles from the single original article transfer location to the multiple respective article transfer locations and in a manner to avoid collisions between the plurality of article transporting carriages.

9. The method according to claim 8, wherein
the step of executing a multiple carriage selecting mode includes,
if the transport destination transfer locations of the plurality of transport request information are located in different traveling directions with respect to the original article transfer location,
selecting, from the predetermined number of article transporting carriages, an article transporting carriage located closer to a first end of the predetermined path in the positional order of the carriages for the transport request information designating a destination article transfer location located in a traveling direction toward the first end relative to an original article transfer location; and
selecting, from the predetermined number of article transporting carriages, an article transporting carriage located closer to a second end of the predetermined path in the positional order of the carriages for the transport request information designating a destination article transfer location located in a traveling direction toward the second end relative to the original article transfer location.

10. The method according to claim 8, wherein
executing said multiple carriage selecting mode when said multiple request condition exists in the absence of any other transport request information designating a different transport starting article transfer location than the original article transfer location designated by the plurality of transport request information; and
executing said single carriage selecting mode when said single request condition exists, or when the multiple request condition exists in the presence of other transport request information designating a different transport starting article transfer location than the original article transfer location designated by the plurality of transport request information.

11. The method according to claim 8, wherein
executing the multiple carriage selecting mode in said multiple request condition regardless of presence or absence of other transport request information designating a different transport starting article transfer location than the original article transfer location designated by the plurality of transport request information.

12. The method according to claim 8, further comprising a manual mode instructing means for instructing execution of said multiple carriage selecting mode; and the method includes a step of:
executing said single carriage selecting mode and said multiple carriage selecting mode when said mode instructing means instructs execution of the multiple carriage selecting mode; and the method executes said multiple carriage selecting mode when said mode instructing means does not instruct the execution of the multiple carriage selecting mode.

13. The method according to claim 8, wherein at least one of the article transfer locations comprises an article storage shelf including a plurality of storage compartments.

14. An article transporting facility comprising:
a single predetermined path disposed along a plurality of article transfer locations and having a first end and a second end;
a plurality of article transporting carriages operable on the predetermined path;
a controller individually controlling the article transporting carriages on the predetermined path to engage in bi-directional movement along the predetermined path and to maintain a sequential positional order with respect to one of the first end and the second end of the predetermined path, the controller configured to execute a single carriage selecting mode and a multiple carriage selecting mode;
wherein in the single carriage selecting mode, the controller selects an article transporting carriage from the plurality of article transporting carriages to transport an article from an original article transfer location to a destination article transfer location among the plurality of article transfer locations, and wherein in the single carriage mode the controller sequentially operates the plurality of article transporting carriages to perform respective article transfer operations unless a traveling range of one of article transporting carriages interferes with the traveling range or position of another article transporting carriage; and
wherein in the multiple carriage selecting mode, the controller selects multiple article transporting carriages to transport multiple respective articles from a single original article transfer location to multiple respective article transfer locations among the plurality of article transfer locations, and wherein in the multiple carriage selecting mode the controller operates the plurality of article transporting carriages to perform respective article transfer operations in sequence to transport the multiple respective articles from the single original article transfer location to the multiple respective article transfer locations and in a manner to avoid collisions between the plurality of article transporting carriages.

15. An article transporting facility as claimed in claim 14, wherein when the traveling range of one of the article transporting carriages interferes with the traveling range or position of another article transporting carriage, the controller operates the other article transporting carriage to move to a non-interfering location on the predetermined path.

16. An article transporting facility as claimed in claim 15, wherein the non-interfering location comprises one of the first end and the second end of the predetermined path.

17. An article transporting facility as claimed in claim 14, wherein in the single carriage selecting mode the controller selects an article transporting carriage from the plurality of article transporting carriages based upon a proximity between the selected carriage and the original article transfer location.

* * * * *